(12) United States Patent
Sankaridurg et al.

(10) Patent No.: US 12,019,313 B2
(45) Date of Patent: *Jun. 25, 2024

(54) LENS FOR MYOPIC EYE

(71) Applicant: Brien Holden Vision Institute Limited, Sydney (AU)

(72) Inventors: Padmaja Rajagopal Sankaridurg, Sydney (AU); Cathleen Fedtke, Sydney (AU); Leslie Alan Donovan, Sydney (AU); Earl Leo Smith, III, Houston, TX (US); Arthur Ho, Sydney (AU); Brien Anthony Holden, Sydney (AU)

(73) Assignee: Brien Holden Vision Institute Limited, Sydney (AU)

( * ) Notice: Subject to any disclaimer, the term of this patent is extended or adjusted under 35 U.S.C. 154(b) by 427 days.

This patent is subject to a terminal disclaimer.

(21) Appl. No.: 17/075,151

(22) Filed: Oct. 20, 2020

(65) Prior Publication Data

US 2021/0132413 A1 May 6, 2021

Related U.S. Application Data

(63) Continuation of application No. 16/272,587, filed on Feb. 11, 2019, now Pat. No. 10,845,624, which is a (Continued)

(30) Foreign Application Priority Data

Mar. 14, 2012 (AU) ................................ 2012901026

(51) Int. Cl.
*G02C 7/00* (2006.01)
*G02C 7/02* (2006.01)
(Continued)

(52) U.S. Cl.
CPC ............. *G02C 7/066* (2013.01); *G02C 7/027* (2013.01); *G02C 7/043* (2013.01); *G02C 7/045* (2013.01); *G02C 7/06* (2013.01); *G02C 2202/24* (2013.01)

(58) Field of Classification Search
CPC ........ G02C 7/066; G02C 7/027; G02C 7/043; G02C 7/045; G02C 7/06; G02C 2202/24; (Continued)

(56) References Cited

U.S. PATENT DOCUMENTS 10,845,624 B2 * 11/2020 Sankaridurg ........... G02C 7/027
2003/0117578 A1 6/2003 Haimerl et al.
(Continued)

FOREIGN PATENT DOCUMENTS

CN 101639575 2/2010
CN 101968575 2/2011
(Continued)

OTHER PUBLICATIONS

International Search Report dated Apr. 9, 2013 for PCT/AU2013/000252.
(Continued)

*Primary Examiner* — James C. Jones
*Assistant Examiner* — Henry Duong
(74) *Attorney, Agent, or Firm* — Jones Day

(57) ABSTRACT

An ophthalmic lens element includes an upper distance viewing zone and a lower near viewing zone. The upper distance viewing zone includes a central region with a first refractive power for clear distance vision and peripheral regions that are relatively positive in power compared to the first refractive power. The lower near viewing zone has a central region that is relatively positive in power compared to the first refractive power to account for accommodative lag. The powers of the peripheral regions of the lower near (Continued)

viewing zone are one of: i) equal to the power of the central region of the lower near viewing zone, ii) relatively positive in comparison to the power of the central region of the lower near viewing zone.

17 Claims, 3 Drawing Sheets

Related U.S. Application Data continuation of application No. 14/385,028, filed as application No. PCT/AU2013/000252 on Mar. 14, 2013, now Pat. No. 10,247,964.

(51) Int. Cl.
  *G02C 7/04* (2006.01)
  *G02C 7/06* (2006.01)

(58) Field of Classification Search
  CPC .......... G02C 7/04; G02C 7/041; G02C 7/042; G02C 7/044
  USPC ...................................... 359/159.06
  See application file for complete search history.

(56) References Cited

U.S. PATENT DOCUMENTS

| | | |
|---|---|---|
| 2004/0008320 A1 | 1/2004 | Shirayanagi |
| 2005/0068490 A1 | 3/2005 | Mandell et al. |
| 2007/0008489 A1 | 1/2007 | Guillous et al. |
| 2012/0194780 A1 | 8/2012 | Back |
| 2012/0257161 A1* | 10/2012 | Varnas ................ G02C 7/06 |
| | | 351/159.42 |
| 2014/0016088 A1 | 1/2014 | De Rossi |

FOREIGN PATENT DOCUMENTS

| | | |
|---|---|---|
| DE | 102009053467 | 7/2010 |
| WO | WO 1999/023527 | 5/1999 |
| WO | WO 2008/031166 | 3/2008 |
| WO | WO 2011/049642 | 4/2011 |
| WO | WO 2011/054058 | 5/2011 |

OTHER PUBLICATIONS

Preliminary Report on Patentability mailed Sep. 16, 2014 for PCT/AU2013/000252.
Meister, Darryl et al. "Introduction to Ophthalmic Optics," San Diego (1999) Carl Zess Vision.

* cited by examiner

LENS FOR MYOPIC EYE

CROSS REFERENCE TO RELATED APPLICATION

This application is a continuation of U.S. application Ser. No. 16/272,587, filed Feb. 22, 2019, which is a continuation of U.S. application Ser. No. 14/385,028, filed Sep. 12, 2014, now U.S. Pat. No. 10,247,964, issued Apr. 2, 2019, which is the National Phase of International Application No. PCT/AU2013/000252, filed 14 Mar. 2013, which designates the United States and was published in English, and which claimed priority to Australian Provisional Application No. 2012901026, filed Mar. 14, 2012. Each of these applications, in its entirety, is incorporated herein by reference.

FIELD OF THE INVENTION

Embodiments of the invention relate to ophthalmic lenses. Other embodiments of the invention relate to methods of correction of myopic refractive error and/or methods of control of development of myopia or control of myopia progression.

BACKGROUND OF THE INVENTION

Myopia, also known as short-sightedness, is a refractive condition of the eye where light from distant objects is focussed in front of the retina. This condition causes distant objects to be perceived blurred by the viewer. Myopia is often first noticed in children at school age and may increase in severity until young adulthood. This phenomenon is often referred to as myopia progression.

The distance vision of people with myopia has been corrected with conventional single-vision lenses, which focus the light from distant objects onto the central retina, the fovea, and thus bring the distant objects clearly into focus.

In recent years, there has been increased interest in the peripheral optics of the eye, due to findings that peripheral refractive errors are associated with refractive error development. Studies on monkeys (Smith et al.) have shown that the peripheral retina can mediate emmetropising responses. Devices and methods for utilising the findings of these studies are described in U.S. Pat. No. 7,503,655 B2 (Smith et al.), the entire content of which is incorporated herein by reference. Several such correction devices, including spectacle lenses and contact lenses, have been designed, some of which have been manufactured and tested in clinical trials (Sankaridurg et al. OVS 2010). The study by Sankaridurg et al. showed a 30% reduction in myopia progression in Chinese children, aged 6-12 years with at least one myopic parent when the children wore spectacle lenses that were designed with the aim to provide clear central vision for distance and reduce peripheral hyperopic defocus.

When focussing on objects at near, myopic eyes may experience accommodative lag i.e. the image is behind the retina and thus the eye experiences hyperopic defocus (blur). Studies have found that there is a correlation between lag of accommodation and progression of myopia. Use of simultaneous vision lenses in the form of bifocal spectacles and in the form of progressive addition spectacles with an ADD power (relative plus compared to distance power, the refractive power of the distance point) reduce the accommodative demand at near and have been prescribed to children with the aim of inhibiting myopia progression. These simultaneous vision lenses are based on central refractive errors and do not take into account the peripheral refractive error profile at near.

A study by Whatham et al. (JOV, 2009) measured peripheral refraction in young myopic adults and found that when viewing near distances i.e. with accommodative effort, the peripheral refractive errors (spherical equivalent, M) became progressively and significantly (p<0.001) more myopic/less hyperopic relative to central refractive error. The relative change in refractive error between distance and near in Whatham et al.'s myopic participant group was about +0.8 D at 40 degrees nasal retina and about +0.2 D at 40 degrees temporal retina.

Reference to any prior art in the specification is not, and should not be taken as, an acknowledgment or any form of suggestion that this prior art forms part of the common general knowledge in any jurisdiction or that this prior art could reasonably be expected to be ascertained, understood and regarded as relevant by a person skilled in the art.

SUMMARY OF THE INVENTION

The present invention provides an ophthalmic lens element for a myopic eye, or an eye that is at risk of myopia, that includes an upper distance viewing zone and a lower near viewing zone. The upper distance viewing zone comprises a central region with a first refractive power that provides for clear distance vision. In addition, the upper distance viewing zone comprises peripheral regions that are relatively positive in power compared to the first refractive power. The relative plus power in the peripheral regions can vary in the nasal and temporal quadrants of the lens to correct for the peripheral refractive error profile at the nasal and temporal retina. The lower near viewing zone has a central region that is relatively positive in power compared to the first refractive power to account for accommodative lag. The powers of the peripheral regions of the lower near viewing zone are one of: i) equal to the power of the central region of the lower near viewing zone, or ii) relatively positive in comparison to the power of the central region of the lower near viewing zone.

Since the eye requires clear vision for distance activities such as driving, playing sport etc. the refractive power in the upper central viewing zone may be constant and uniform across the zone. For a spectacle lens the zone may vary in size from about 10 mm across to about 30 mm across. The peripheral zones in the distance viewing zone are located adjacent to the central viewing zone. These peripheral regions provide a positive power relative to the central distance viewing zone. The relatively positive power can vary from 0.25 D to 4.0 D.

Embodiments of the current invention are designed for use in eyes with or at risk of developing myopia to prevent myopia or to arrest or slow the progression of myopia. Thus it will be appreciated that the first refractive power of the distance zone will be determined based on the wearer's requirements for distance vision and can vary across a range of powers (from +1.00 D to −9.00 D). The second, third, fifth and sixth refractive powers in the peripheral zones and the fourth refractive power for near vision all provide the signal to prevent myopia in an eye at risk of myopia or to slow or arrest the progression of myopia in an eye that is already myopic.

Further aspects of the present invention and further embodiments of the aspects described in the preceding paragraphs will become apparent from the following description, given by way of example and with reference to the accompanying drawings.

DETAILED DESCRIPTION OF THE DRAWINGS

DETAILED DESCRIPTION OF THE EMBODIMENTS

Figure 1:
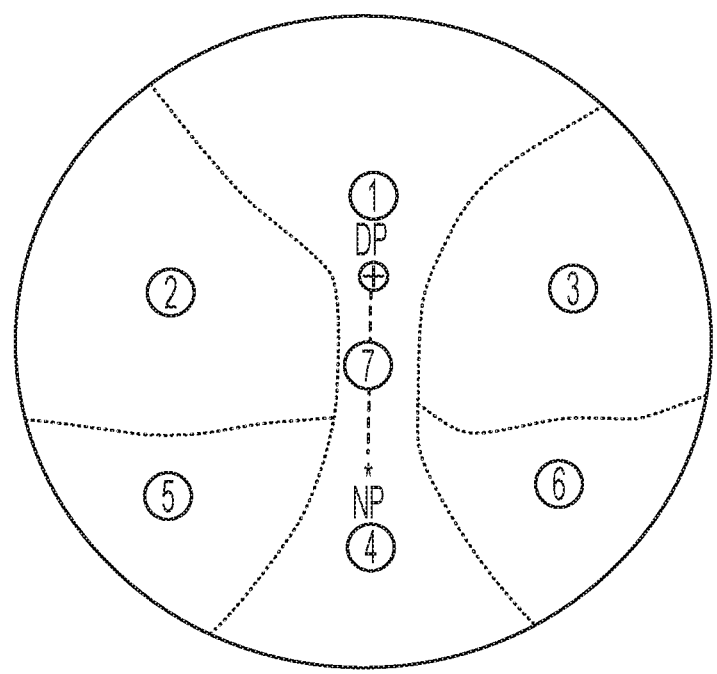
FIG. 1 shows a representation of an embodiment of an optic zone of an ophthalmic lens element of the present invention.

In a further study on the change in peripheral refractive state with "accommodation, the inventors have found that when the eye shifts gaze from distance to near (in this study the near measurements were taken in a range of 20 to 33 centimetres inclusive), there is a reduction in peripheral hyperopia at most eccentricities and the change is on average about +1.2 D at 40 degrees nasal retina and about +2.0 D at 40 degrees temporal retina. This study also indicates the general relationship between change in peripheral refractive state with accommodation from the study by Whatham et al. (which showed a flatter change with eccentricity).

The present invention utilises the relationship between accommodative state and refractive error in the periphery, to provide an ophthalmic lens element for a myopic eye or an eye that is at risk of myopia designed for an increased range of refractive states. This may be important for individuals, particularly children (about 16 years old and younger) who have myopia or who are likely to become myopic and that spend substantial time indoors, when their eyes are focussed at near (e.g. when reading) or at intermediate distances (e.g. when inside a room with walls and other objects about 1-10 metres away). The ophthalmic lens element is one that, in use, remains in a fixed or relatively fixed location and orientation relative to the eye as the eye moves between looking straight ahead (when the eye may be more often viewing at distance) and looking downwards (when the eye may be more often viewing at near). For example, the ophthalmic lens element may be a spectacle lens or a translating contact lens with a suitable orienting mechanism, such as a ballast or prism. The ophthalmic lens element may be one of a pair, for provision together to a recipient.

Embodiments of the invention incorporate in part optical characteristics of the ophthalmic lens elements described in U.S. Pat. No. 7,503,655 B2 (Smith et al.), which can be used, for a myopic eye, to reduce or correct or over correct peripheral hyperopic defocus at distance. These embodiments recognise that, for near viewing, the correction of relative hyperopic defocus is either not required, or required only to a lesser extent.

Embodiments of the invention also include asymmetry, selected in response and to take account of asymmetry of the refractive error in the nasal and temporal meridians.

Embodiments of the invention include an ophthalmic lens with a number of zones or regions, each zone or region having a refractive power.

For distance viewing, the ophthalmic lens element includes, in an upper viewing zone, a central zone of power that corrects for the central refractive error and a peripheral zone that is relatively plus compared to the central zone that corrects for the distance peripheral hyperopic defocus. The relative plus power in the peripheral zone can vary from 0.25 D to 4.00 D and can differ between the nasal and temporal quadrants. For near viewing, the ophthalmic lens element requires in the near viewing zone, a central zone that is relatively plus compared to the central distance zone to correct for the accommodative lag. The relative plus in the near zone can vary from 0.5 D to 4.00 D, with a typical ADD power being between 1.0 and 2.5 D. Since for near distances, there is minimal to no peripheral retinal hyperopia relative to the centre, the peripheral zones at near viewing require less or no correction of additional near peripheral retinal hyperopia. Thus the relative plus in the near peripheral zones can vary from 0.0 D to 3.00 D compared to the near viewing zone. The relative plus of the near peripheral zones may be selected to be equal to or less than the relative plus for the distance peripheral hyperopic defocus.

In some embodiments the near viewing peripheral zones have refractive powers that have ADD powers that are half or less than half of the ADD powers of the distance viewing peripheral zones across a range of field angles. This range of field angles may be selected from the group about 10-40 degrees, about 20-40 degrees or about 30-40 degrees. The sections between about 5 degrees to the lower bound of these ranges may be provided with a smooth transition in power.

FIG. 1 shows a representation of an embodiment of an optic zone of an ophthalmic lens element of the present invention. The optic zone may be coterminous with the lens, for example as is typical for spectacle lenses, or may be part of the lens, for example as is typical for a soft contact lens. For the purposes of explanation, the optic zone shown in FIG. 1 is divided into six regions by dotted lines. Each region occupies sufficient area of the lens to be optically effective. For example, regions 1 and 4 are sufficiently large to provide acceptable distance and near vision respectively. This may involve each region occupying at least 10 percent of the optic zone of the ophthalmic lens element. As explained below, in some embodiments select adjacent regions may have the same refractive properties, or form part of the same refractive profile. In other embodiments the regions may have different refractive properties that are not the continuation of a common refractive profile, in which case the dotted lines represent either a transition between the two regions or a mid-point of a blending zone between the regions. The location of the dotted lines in FIG. 1 are exemplary only and the location on the ophthalmic lens element of the transition/mid-point represented by these lines may vary in other examples.

Regions 1, 2 and 3 are designed for distance vision and regions 4, 5 and 6 are designed for near vision. The lens may accordingly be viewed as a modified form of a bifocal lens or progressive addition lens.

Region 1 is an upper viewing region which may have a substantially constant refractive power for coaxial light rays received by the ophthalmic lens element in the region. This first refractive power is selected having regard to the uncorrected eye. For example, the first refractive power may correct the distance vision of a myopic recipient of the lens so as to provide substantially clear distance vision.

In another example, the first refractive power may be selected to reduce the on-axis myopic defocus, but under correct the myopia by a certain amount that still provides acceptable distance vision, for example by retaining 0.25 D myopic defocus or less. Within region 1 is a distance point (DP), which corresponds to the expected location through which the optical axis of the eye extends through the ophthalmic lens element when the recipient is looking straight ahead at a distant object. This expected location may be selected having regard to the specific recipient and other factors, such as the carrier of the lens when the lens is a spectacle lens, or may be selected having regard to experience, such as population averages. As shown in FIG. 1, the DP is located approximately at a throat in refractive power profile formed between regions 2 and 3. Region 1 expands laterally across the lens above this throat, to occupy areas of the lens above regions 2 and 3.

Regions 2 and 3 provide additional refractive power over region 1 (an ADD power). For convenience and clarity of explanation, these are described herein so that region 2 has a 'second refractive power', and region 3 has a 'third refractive power'. The second and third refractive powers may be the same in a symmetric design, or they may differ in an asymmetric design.

In one embodiment the powers of regions 2 and 3 are selected having regard to the refractive state of the recipient eye for peripheral vision (light rays at sufficiently high field angles so as to be received by the retina outside of the fovea). The objective in providing regions 2 and 3 is to either avoid hyperopic defocus by placing the peripheral image substantially on the retina, or introduce some myopic defocus for peripheral vision, for example between 1.0 D to 3.5 D. In another embodiment, the powers of regions 2 and 3 are selected having regard to population averages. Also a range of lenses may be provided having regard to expected deviations between individuals, allowing a practitioner to select an appropriate lens for their patient.

In one embodiment regions 2 and 3 each have a substantially constant power. These refractive powers may for example be selected from the range of +0.25 D to +4.0 D ADD power relative to the first refractive power, for example they may be selected from the range +1.0 D to +3.0 D, and in generally more preferred embodiments are at least +2.0 D. In this embodiment the dotted line may represent a substantial step change or the mid-point of a blending region. For a spectacle lens the blending region may, for example, be between 1 to 5 mm. For a translating contact lens, the blending region may be between about 0.2 mm to 1.5 mm. The blending region, when provided, smooths the transition between region 1 and regions 2 and 3. In other embodiments one or both of regions 2 and 3 may have a refractive power that varies across the region. For example, the refractive power of regions 2 and 3 may increase with increasing distance from the DP, from about +0.25 D out of the transition/blending zone through to +4.00 D at 40 degrees field angle. The rate of increase may be substantially constant or may also increase with increasing distance from the DP.

While reference has been made specifically to the DP, other lens designs may use a different reference point for the increasing power of regions 2 and 3, for example the geometric centre of the lens or may have an increasing power profile towards the periphery of the ophthalmic lens element designed without reference to any particular point on the lens. In some embodiments, regions 2 and 3 may be designed having regard to the measured peripheral refractive state of the recipient eye, including variations in refractive power of the eye with increasing field angle.

Further information on providing an ADD power for peripheral vision with the objective of reducing or eliminating progression of myopia is described in incorporated U.S. Pat. No. 7,503,655 B2.

In alternative embodiments, the region 1 may also include increasing power towards the vertical top of the lens, to provide an ADD power for peripheral vision vertically, in addition to the lateral peripheral vision ADD power provided by regions 2 and 3. In this case regions 2 and 3 join above region 1 (which will still occupy an optically effective area, for example at least 10% of the optic zone, wherein measured region 1 is defined by ±0.25 D of the target power to provide clear distance vision). However the extent of plus power may vary between the horizontal directions and the vertical direction.

Region 4 has a fourth refractive power that also has an ADD power relative to region 1. Region 4 may have a power selected to correct near vision of a myopic recipient (or a recipient that is at risk of developing myopia). This requires a region 4 ADD power relative to the correction required for distance vision due to a phenomenon in myopic patients known as lag of accommodation.

Region 4 may have a substantially constant refractive power for coaxial light rays received by the ophthalmic lens element in the region. Region 4 includes a near point (NP), which corresponds to the expected location where the optical axis of the eye extends through the ophthalmic lens element when the recipient is looking at a near object, for example during reading. Generally, a person looking at a near object shifts their gaze downwards, which is why the NP is below the DP. The refractive power of the NP is selected having regard to the accommodative lag of the patient or a population average and may, for example, have an ADD power relative to the DP of between +0.5 D and +4.0 D inclusive.

As shown in FIG. 1, the DP is located above the central horizontal meridian of the lens and the NP is located below the central horizontal meridian of the lens, with the NP located further from the central horizontal meridian than the DP. Also, regions 2 and 3 traverse and extend below the central horizontal meridian of the lens, so that these regions occupy more of the lens than regions 5 and 6. For example, regions 2 and 3 (in combination with region 1) may occupy 55 to 70 percent of the vertical dimension of the lens, whereas regions 5 and 6 (in combination with region 4) may occupy the remaining 45 to 30 percent.

In some embodiments, the NP is located directly below the DP (having regard to the expected orientation of the lens during use). These embodiments do not include any provision for the optical axis of people moving slightly nasally when reading. In other embodiments the NP may be shifted nasally, up to about 5 mm on a spectacle lens, to reflect the shift in optical axis or eye convergence.

Between regions 1 and 4 is a channel 7. Along the channel the refractive power changes between the distance vision power of region 1 to the near vision power of region 4. In one embodiment this change in refractive power is substantially linear, although other embodiments may have different power profiles with varying gradient along the channel 7 or with a step-wise change in power, including a step-wise change with blending to smooth the transition. It will be appreciated that while a channel can be visibly discerned in FIG. 1 due to the definition of the regions 1 to 6, in reality there will be no clearly defined channel, merely a change in refractive state between the DP and the NP and changes in refractive state away from the DP and NP.

Regions 5 and 6 occupy the lower portion of the lens that is riot covered by region 4. In some embodiments the refractive powers of regions 5 and 6, the fifth and sixth refractive powers respectively, are the same as the fourth refractive power. Accordingly, in these embodiments the entire lower portion of the lens may have a power selected for the NP. This reflects the change in natural peripheral refraction when the eye accommodates and the profile becomes flatter (less hyperopic in the periphery relative to on-axis when the eye accommodates than when the eye is viewing distant objects).

In other embodiments, one or both of regions 5 and 6 have an ADD power relative to the refractive power of region 4. The region 5 ADD power may be the same as the region 6 ADD power in a symmetric design, or the region 5 and 6 ADD powers may differ in an asymmetric design.

In some other embodiments the region 5 and 6 ADD powers are designed having regard to the natural peripheral refractive state of the accommodated eye and may therefore be similar to any of the options described for regions 2 and 3 described above, but with reduced magnitude, at least in the far peripheral field, to reflect the flatter profile with increasing field angle. Generally, if region 2 has a substantially constant refractive power, region 5 will have a substantially constant power and if region 2 has an increasing refractive power towards the periphery of the lens then region 5 will also have an increasing refractive power towards the periphery. Regions 3 and 6 may have a like relationship. The ADD powers (relative to the fourth refractive power) of the fifth and sixth regions may be half or less than half of the ADD powers (relative to the first refractive power) of the second and third regions, or may be between 1.00 D and 2.00 D (inclusive) less than the ADD powers of the second and third regions respectively.

Figure 2:
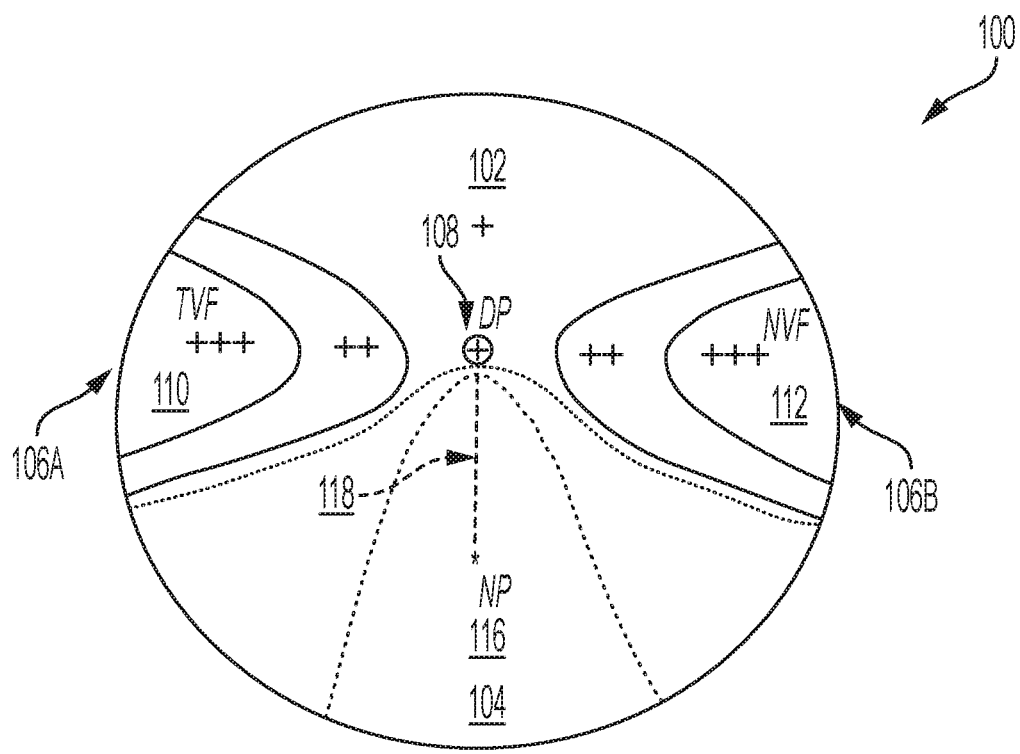
FIG. 2 shows a simplified representation of an ophthalmic lens element.
Figure 3:
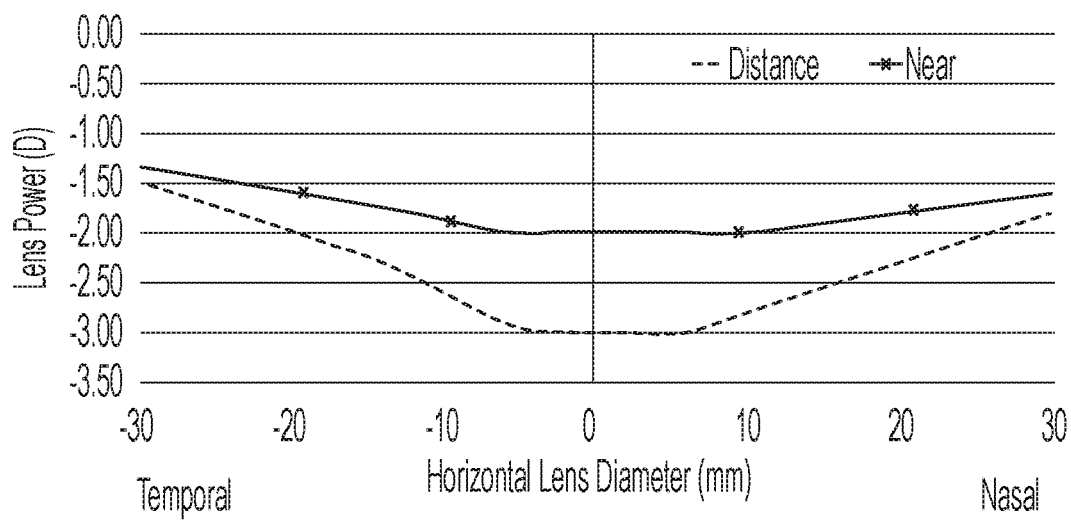
FIG. 3 shows an example of the power profile of the lens shown in FIG. 2 in the embodiment when the regions 5 and 6 have an increasing power relative to the Region 4 power.
Figure 4:
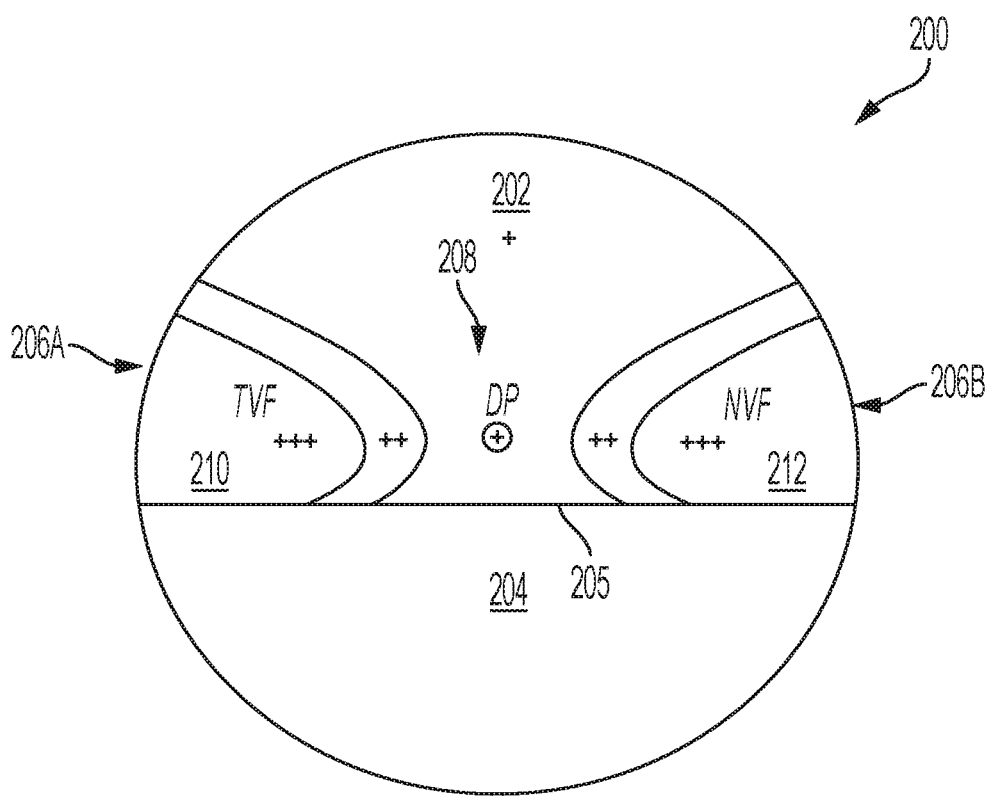
FIG. 4 shows a simplified representation of an example of an ophthalmic lens element, which is based on an Executive style lens design.

The following description of embodiments provide specific examples of lenses, in particular spectacle lenses, with the regions 1 to 6 as described above. It will be appreciated that many additional variations of lens may be designed while retaining the general structure, purpose and effects described herein. In contrast to FIG. 1, which showed regions of the lens by dotted lines, unless otherwise indicated or required by the context, the lines in FIGS. 2 to 4 represent lines of equal refractive power for paraxial light rays. It will be appreciated that the embodiments are also applicable to the optic zone of a translating contact lens.

FIG. 2 shows a simplified representation of an ophthalmic lens element 100. The Ophthalmic lens element includes an upper viewing region 102 (Region 1 of FIG. 1), a lower viewing region 104 (Region 4 of FIG. 1) and peripheral regions 106A, 106B (Regions 2 and 3 respectively of FIG. 1) disposed on either side of the upper viewing region 102.

The upper viewing region 102 includes a foveal vision zone 108 incorporating the distance point (DP) for the lens, which provides a first refractive power, selected to provide clear distance vision for the recipient. The refractive power of the upper viewing region 102 is either substantially constant or has a small ADD power (represented by the single +). The circle representing the foveal vision zone 108 and the cross + within the circle are intended to show the location of the zone and the DP, not the provision of an ADD power over trie power selected to correct distance vision. The other crosses + and ++ and +++ show increasing ADD power over the power at the DP, with additional crosses indicating a larger ADD power.

The peripheral regions 106A, 106B on either side of the foveal vision zone 108 include a temporal power ramp 110 and a nasal power ramp 112. The power ramps 110 and 112 have an increasing positive power towards the peripheral edge of the lens. The increase in positive power provides an optical correction across and around a horizontal meridian extending through the DP of a type described in incorporated U.S. Pat. No. 7,503,655 B2 (Smith et al). The power profile of the lens smoothly and progressively transitions from the refractive power of the upper viewing zone 102 to the maximum refractive powers of the peripheral regions 106A, 106B, which are located substantially at the edge of the lens element 100.

The increase in positive power in the peripheral regions 106A, 106B may be equal for both the temporal 110 and the nasal 112 power ramp zones, so that the lens is substantially symmetrical about a central vertical meridian. Alternatively, the increase in positive refractive power may be asymmetric along the lateral visual field meridian, for example to reflect either asymmetry in the individual patient's visual field or asymmetry determined from population averages.

The lower or near viewing region 104 provides an ADD power relative to the first refractive power. The ADD power may have its greatest value at the near point (NP) 116 and remain constant below the NP, so that the region corresponding to region 4 of FIG. 1 has a substantially constant power. As shown in FIG. 2, the NP may be located at a mid-point between the upper viewing zone 102 and the bottom central peripheral edge of the lens. The NP may alternatively be located above this mid-point, for example between 25% to 40% of the distance from the DP to the bottom central peripheral edge of the lens to reduce the distance that the eye needs to move from an ahead distance viewing position to a near viewing position. This alternative higher positioning of the NP may facilitate a faster change in focus from distance to near.

The change from the upper viewing region 102 to the lower viewing region 104 may be achieved by a corridor of changing refractive power 118 in which the power profile of the lens progressively and smoothly transitions between the refractive power of the foveal vision zone 108 to the refractive power of the near viewing region 104. Accordingly, along this corridor the lens may have a refractive power profile similar to what is commonly called a progressive addition lens. The corridor 118 extends from the distance point to the near point. The corridor 118, which in FIG. 2 is indicated by a vertical dashed line, may also be tilted or inclined to adjust for convergence of the eyes when viewing close objects. The choice of ADD power may be made having regard to the accommodative lag of the recipient or population average when performing near vision tasks. As mentioned above, the refractive power may transition from the refractive power of the foveal vision zone 108 in the upper viewing region 102 to the refractive power of the near viewing region 104 at the near point and then remain substantially constant from the near point to the peripheral edge of the lens.

In one embodiment of the lens design shown in FIG. 2, the peripheral regions on either side of the NP (Regions 5 and 6 of FIG. 1) have substantially the same refractive power as at the NP. The lens may be designed to have a smooth transition from Regions 4 to 6 (FIG. 1) into the power profiles of peripheral regions 106A and 106B. In another embodiment the power increases in Regions 5 and 6, but at a slower rate than across a meridian through the DP. These embodiments are respectively represented in FIG. 2 by the two dashed lines that generally form the inverted U shape.

An example power profile along a horizontal meridian through the DP is shown in FIG. 3 as the 'Distance' profile. FIG. 3, by the inclusion of a variable power profile along a horizontal meridian through the NP represents the second embodiment above, which is described in more detail below. It will be appreciated from the foregoing description that for the first embodiment the power profile along the horizontal meridian through the NP may be substantially constant, subject to variations that provide a smooth transition into peripheral regions 106A and 106B.

FIG. 3 shows an example of the power profile of the lens shown in FIG. 2 in the embodiment when the regions 5 and 6 have an increasing power relative to the Region 4 power. The independent variable is radial distance from the vertical centre of the lens, which is for the purposes of FIG. 3 through the DP. The dependent variable is refractive power, resulting for example from shaping of the front surface of the lens, and the graph shows two plots of refractive power, one along a horizontal meridian through the DP (Distance) and one along a horizontal meridian through the NP (Near).

The lens represented by FIG. 3 is a spectacle lens for a 3D myope. A translating contact lens may have a similar power profile, but with reduced dimensions to reflect the positioning of the contact lens in front of and substantially on the cornea, instead of at distance in front of the cornea for a spectacle lens. The corridor 118, which in FIG. 2 is indicated by a vertical dashed line, extends approximately 5 mm in the nasal and temporal directions about the DP and expands and shifts nasally at the NP. The NP has a NP refractive power of an ADD power of 1 D relative to the first refractive power of the DP. Referring to the regions of FIG. 1 applied to the lens of FIG. 3, region 2 has a progressive ADD power relative to the first refractive power of about 0.4 D at 10 mm, about 1.0 D at 20 mm and about 1.5 D at 30 mm. Region 3 has a progressive ADD power relative to the first refractive power of about 0.25 D at 10 mm, about 0.75 D at 20 mm and about 1.25 D at 30 mm. Region 5 has a progressive ADD power relative to the NP refractive power which is less than the ADD power of region 2 (which is relative to the first refractive power), up to about 0.65 D at 30 mm. Region 6 has a progressive ADD power relative to the NP refractive power which is less than the ADD power of region 3 (also relative to the first refractive power), up to about 0.4 D at 30 mm. This lens is accordingly asymmetrical about its vertical centre.

Regions 5 and 6 accordingly provide about half the ADD power over the refractive power at the NP than regions 2 and 3 provide over the refractive power at the DP. Due to the flattening refractive profile of a myopic eye when viewing near objects it is not expected that regions 5 and 6 would require more than half the ADD power of regions 2 and 3. However, in other embodiments, regions 5 and 6 may provide less than half the ADD power in comparison to regions 2 and 3.

FIG. 4 shows a simplified representation of an example of an ophthalmic lens element 200, which is based on an Executive style lens design. An Executive style lens provides correction for both distance and near viewing. The ophthalmic lens element 200 includes an upper viewing region 202 (Region 1 of FIG. 1), a lower viewing region 204 (Regions 4, 5 and 6 of FIG. 1) and peripheral regions 206A, 206B (Regions 2 and 3 respectively of FIG. 1).

The upper viewing region 202 includes a foveal vision zone 208 with a distance point (DP) for reference. This zone provides a first refractive power for clear distance vision. The process of selection of the location and power of the upper viewing region 202 was described in embodiment 1.

The first refractive power for clear distance vision is provided below the DP as well as above the DP and continues down to a discontinuity in the power profile where the lower or near viewing region 204 commences.

The peripheral regions 206A, 206B on either side of the foveal vision zone 208 include a temporal power ramp 210 and a nasal power ramp 212. The increase in positive power provides an optical correction similar to peripheral regions 106A and 106B described for embodiment 1. As for embodiment 1, the peripheral regions 206A, 206B may provide symmetrical or asymmetrical power ramps.

The lower or near viewing region 204 provides an ADD power relative to the first refractive power. In this embodiment the lower or near viewing region 204 extends across the entirety or substantially across the entirety of the lens along a lateral meridian and has a substantially constant refractive power along the lateral meridian and below. Unlike the progressive addition style lens design of embodiments 1 and 2 above where the power increases progressively between the DP and the NP, the upper and the lower viewing zones of the executive lens design are distinct from each other, separated by the discontinuity 205 in the power profile.

Figure 5:
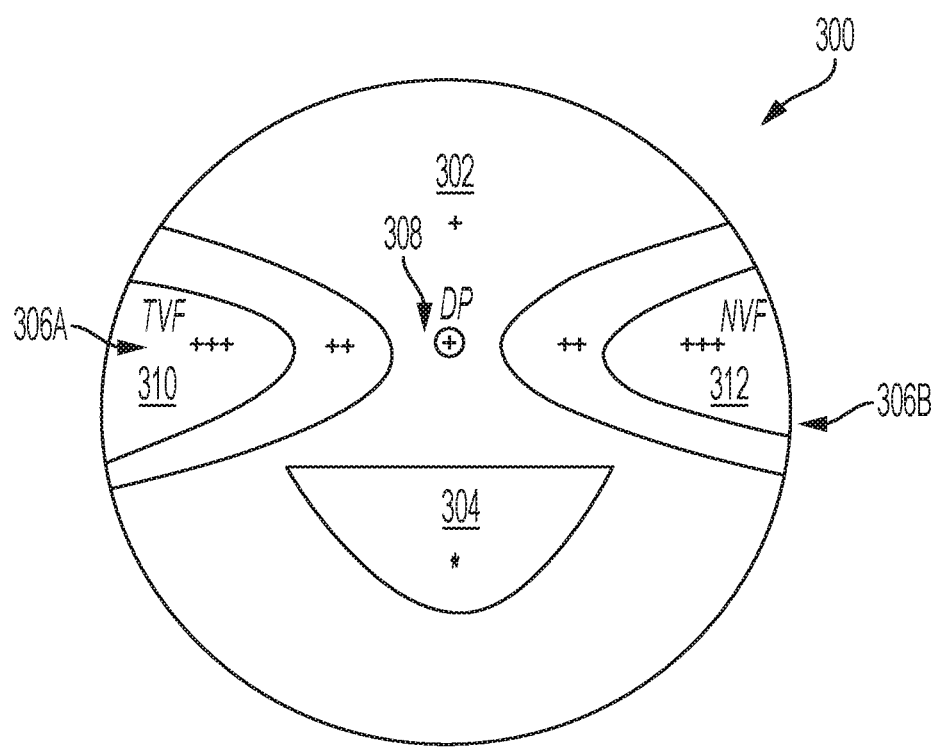
FIG. 5 shows a simplified representation of an example of an ophthalmic lens element based on a bifocal spectacle lens design.

In addition to the progressive addition and the Executive style lens designs described above, a bifocal lens design may also be used for simultaneous correction of ametropia, accommodative lag and presbyopia. FIG. 5 shows a simplified representation of an example of an ophthalmic lens element 300 based on a bifocal spectacle lens design. The ophthalmic lens element includes an upper viewing region 302 (Region 1 of FIG. 1). The upper viewing region 302 includes a foveal vision zone 308 with a distance point (DP) for reference. This zone provides the first refractive power for clear distance vision.

The ophthalmic lens element also includes a lower viewing region 304 (Region 4 of FIG. 1) and peripheral regions 306A, 306B (Regions 2 and 3 respectively of the FIG. 1) disposed on either side of the DP. The bifocal lens design provides a first refractive power for clear distance vision in the upper viewing region 302 and a second refractive power in the lower viewing region 304 for near vision tasks. The second refractive power has an ADD power relative to the first refractive power.

Unlike the Executive style lens design, which provides the second refractive power throughout the lower viewing region, the bifocal lens design provides the lower viewing region 304 in a smaller segment within the lens of first-power. The lower viewing region 304 may in alternative embodiments be displaced to adjust for convergence of the eyes when viewing close objects. Outside of the lower viewing region 304 (Regions 4, 5 and 6 of FIG. 1 not occupied by the lower viewing region 304) the lens has the same power as the power selected for the DP.

The laterally peripheral regions 306A, 306B on either side of the foveal vision zone 308 include a temporal power ramp 310 and a nasal power ramp 312 that increase in positive power, similar to the power ramps described with reference to Embodiments 1 to 3 and which may be symmetrical or asymmetrical.

In other embodiments, the refractive power in region 1 (see FIG. 1) may not be substantially constant, but may increase in a similar manner to regions 2 and 3 described above in relation to Embodiment 1. This may provide for control of the focal point for images to be received below the fovea in addition to the control provided by regions 2 and 3 for images to be received to the right and left of the fovea. In one implementation of this embodiment, the lens is rotationally symmetrical across regions 1 to 3, so that outside of regions 4 to 6 the lens has a similarly progressively increasing power profile with increased radius from the DP (or other central reference point such as the geometric centre of the lens, if that differs from the DP). In addition, in one option regions 2 and 3 may be designed so that at a lateral distance substantially equal to the distance from the DP to the NP, the region 2 and region 3 ADD power is the same as the difference between the NP and DP, creating an embodiment with further rotational symmetry. Rotational asymmetry will be present due to the provision of decreased ADD power in regions 5 and 6 relative to the ADD power in regions 2 and 3. Rotational asymmetry will also be present due to the flattening of the power profile below the NP.

Any of the embodiments described above and further embodiments may be implemented using a lens base such as spectacle lenses or translating contact lenses. To manufacture a lens according to the present invention, the power profiles of the various embodiments described herein may first be translated into a lens thickness profile for input to computer assisted manufacturing. The relevant lens power profile is converted to an axial thickness profile for the lens, taking account of the refractive index of the lens material. Features of the power/thickness profiles can either be put on the front or the back surface or a combination of both. Once all the parameters i.e. the thickness profile, power profile, back surface shape, diameter and refractive index of the material have been determined, then this is input to a computer assisted lathe to produce a lens.

In some embodiments electro-active spectacle lenses may be used that include an electro-active optical element embedded in either an Optical substrate (such as a finished or unfinished lens blank) or a conventional lens. When voltage is applied to the electro-active optical element the refractive power of the element may change relative to the refractive power of the substrate. Liquid crystal may be used as part of the electro-active element, and the refractive index is then changed by generating an electric field across the liquid crystal. The electric field may be generated by applying one or more voltages to electrodes connected to the liquid crystal. By using an electro-active matrix the refractive power can be controlled individually for a number of different regions across the lens. It will be understood that various different types of electro-active technologies may be suitable for implementing lenses according to the aspects of the invention described herein.

As used herein the terms first, second, third etc. are used to denote separate features, e.g. "first region" and "second region", and are not used to denote order or relativity.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. An ophthalmic lens comprising:
   a first region including a distance point corresponding to the expected location through which the optical axis of the eye extends through the ophthalmic lens when a recipient is looking straight ahead at a distant object;
   a second region located laterally to one side of the distance point;
   a third region located laterally to the other side of the distance point;
   a fourth region located below the first region;
   a fifth region located laterally to one side of the fourth region; and
   a sixth region located laterally to the other side of the fourth region;
   wherein the ophthalmic lens has a first refractive power within the first region, a second refractive ADD power in the second region, a third refractive ADD power in the third region, a fourth refractive ADD power in the fourth region, a fifth refractive ADD power in the fifth region, and a sixth refractive ADD power in the sixth region;
   wherein the fourth refractive ADD power is greater than the first refractive power;
   wherein the fifth and sixth refractive ADD powers are greater than the fourth refractive power and the region five or region six refractive ADD power is less than the region two or region three refractive ADD power; and
   wherein the ophthalmic lens is in a configuration such that when the eye moves between looking ahead and downwards the lens remains in a fixed or relatively fixed location and orientation relative to the eye.

2. The lens of claim 1, wherein each of the first, second, third, fourth, fifth and sixth regions occupy at least one tenth of the area of the optic zone of the ophthalmic lens.

3. The lens of claim 1, wherein the second and third refractive powers comprise an ADD power relative to the first refractive power of between 0.25 D and 4.0 D inclusive.

4. The lens of claim 3, wherein the ADD powers of the fifth and sixth regions are half or less than half of the ADD powers of the second and third regions.

5. The lens of claim 1, wherein the fourth refractive power comprises an ADD power relative to the first refractive power of between 1.0 D to 2.5 D.

6. The lens of claim 1, wherein:
   the second and third refractive powers each comprise an ADD power of at least 2.0 D relative to the first refractive power; and
   the ADD powers of the fifth and sixth regions relative to the fourth refractive power are each between 1.00 D and 2.00 D (inclusive) less than the ADD power of the second and third regions relative to the first refractive power respectively.

7. The lens of claim 1, wherein the second and third refractive powers increase towards convergence with the fifth and sixth refractive powers with increasing field angle.

8. The lens of claim 1, wherein the first region extends from the distance point towards an upper periphery of the lens and has a substantially uniform refractive power.

9. The lens of claim 8, wherein the first region includes, at locations above the distance point and above the second and third regions, a refractive power having ADD power relative to the first refractive power.

10. The lens of claim 1, wherein the first region includes a portion located above the second and third regions.

11. The lens of claim 1 configured to have a power profile that progressively transitions between the refractive power of the first region and the refractive power of the fourth region.

12. The lens of claim 1 configured to have a power profile that progressively transitions between the refractive power of the first region and the refractive power of the second and third regions.

13. The lens of claim 1, wherein the fourth region has a substantially constant refractive power across its area.

14. The lens of claim 1, wherein the refractive powers of the fourth, fifth and sixth regions are substantially the same and substantially uniform across the fourth, fifth and sixth regions.

15. The lens of claim 1, wherein the lens is a spectacle lens.

16. The lens of claim 1, wherein the lens is a translating contact lens.

17. A method of manufacturing an ophthalmic lens comprising:
   forming a lens base so that:
   a first region includes a distance point located to be substantially aligned with an expected location of an optical axis of the eye during ahead distance vision;
   a second region is located laterally to one side of the distance point;
   a third region is located laterally to another side of the distance point;
   a fourth region is located below the first region;
   a fifth region is located laterally to one side of the fourth region; and
   a sixth region located laterally to another side of the fourth region; and
   wherein the ophthalmic lens has a first refractive power within the first region, a second refractive ADD power in the second region, a third refractive ADD power in the third region, a fourth refractive ADD power in the fourth region, a fifth refractive ADD power in the fifth region, and a sixth refractive ADD power in the sixth region;
   wherein the fourth refractive ADD power is greater than the first refractive power; and
   wherein the fifth and sixth refractive ADD powers are greater than the fourth refractive power and the region five or region six refractive ADD power is less than the region two or region three refractive ADD power.

* * * * *